UNITED STATES PATENT OFFICE.

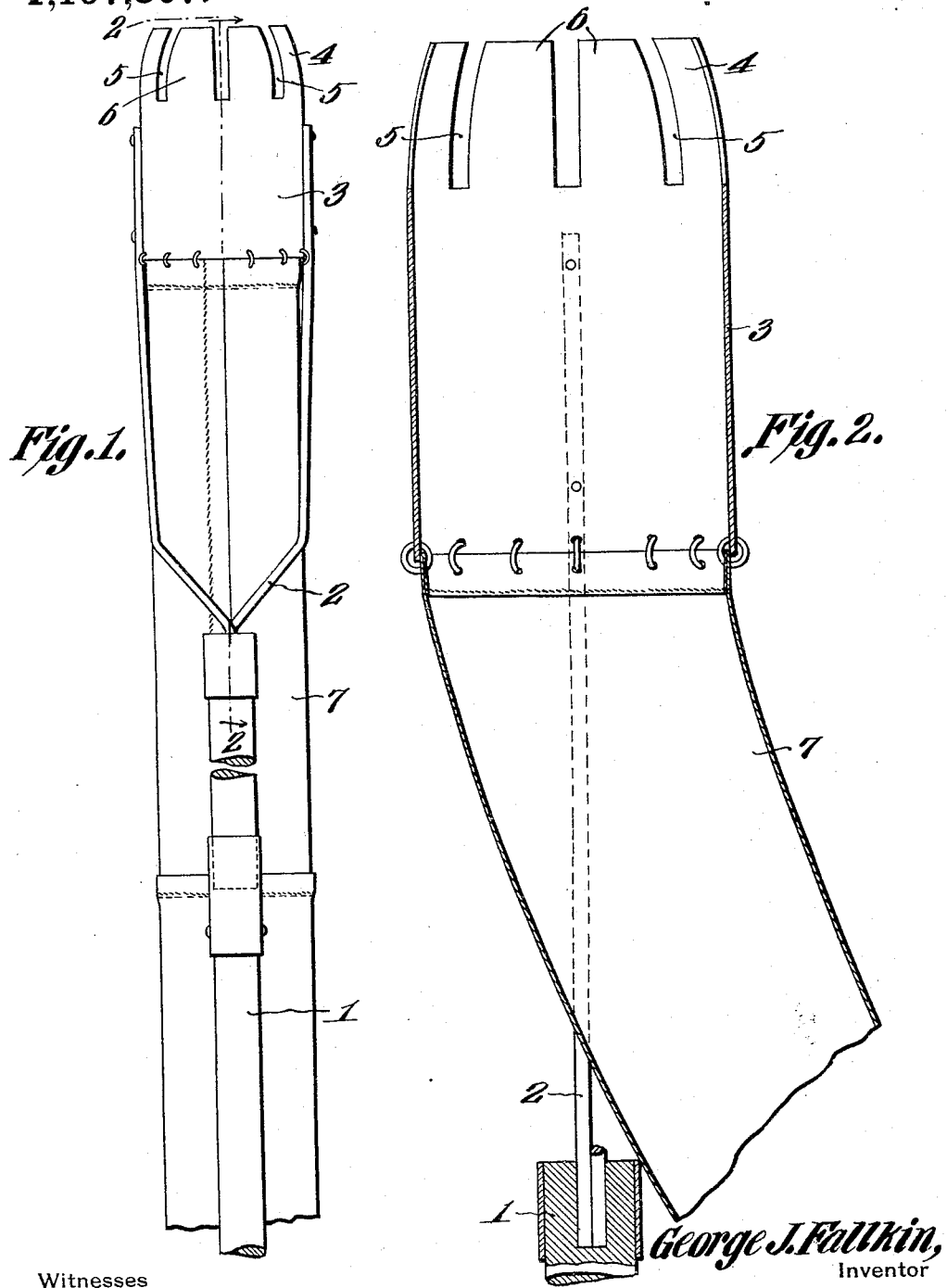

GEORGE J. FALLKIN, OF SAN JOSE, ILLINOIS.

FRUIT PICKER AND GATHERER.

1,197,807.  Specification of Letters Patent.  Patented Sept. 12, 1916.

Application filed October 20, 1913. Serial No. 796,296.

*To all whom it may concern:*

Be it known that I, GEORGE J. FALLKIN, a citizen of the United States, residing at San Jose, in the county of Mason and State of Illinois, have invented a new and useful Fruit Picker and Gatherer, of which the following is a specification.

The present invention appertains to fruit pickers or gatherers, and aims to provide a simple, compact, durable, and inexpensive device of that character, which will be simple, convenient and efficient in its use, to permit the fruit to be readily plucked and gathered, without the necessity of the operator climbing the tree, or employing a ladder, or the like, which is laborious and otherwise objectionable.

Another object of the present invention, is to provide a device of the character indicated, which will be so constructed as to permit the fruit to be severed from the stems or branches without the liability of the fruit becoming bruised, means being provided for delivering the fruit to the ground without injury thereto.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein—

Figure 1 is an elevation of the device, portions being broken away. Fig. 2 is an enlarged sectional detail, taken on the line 2—2 of Fig. 1.

In carrying out the present invention, there is provided a pole or staff 1, which may be of any suitable length, and which is preferably constructed of sections, permitting the pole to be lengthened and shortened, as desired. The joints between the staff or pole sections may be of any suitable type.

To the upper end of the staff or pole, is attached a longitudinal fork 2, said fork being preferably fashioned from a rod, or the like, and the shank of the fork being secured within the end of the staff or pole, so that the branches or arms of the fork lie in a plane in which the axis of the staff or pole is disposed.

Between the free ends of the fork arms or branches, is riveted or otherwise secured a sleeve or cylindrical shell 3, the upper end portion of the sleeve being gradually contracted or tapered as at 4, and being provided with longitudinal spaced open slots 5 having their edges approximately parallel. The slots 5 are spaced circumferentially to provide relatively wide tongues 6, having their ends blunt. It will thus be observed, that the tongues are curved both transversely and longitudinally, to strengthen the same, and furthermore, the tongues are tapered from their butt to their free ends.

Secured to the lower end of the sleeve 3, between the arms or branches of the fork 2, is the upper end of a chute or conveyer 7, which is preferably fashioned from textile material, and which extends from between the arms of the fork over one side of the staff, the chute or conveyer extending along the staff and being attached thereto in any convenient manner, the chute or conveyer also being preferably constructed in sections detachably connected, similar to the staff sections.

The sleeve 3 is co-axial with the staff or pole, and is spaced from the end of the staff, the fork or bracket 2 serving to attach the sleeve to the end of the staff, and the conveyer of chute extending from the lower or inner end of the sleeve downward along the staff.

In use, the staff or pole 1 is manipulated so as to insert the mouth or upper end of the sleeve 3 over the fruit to be plucked or severed, this will permit the stem of the fruit to be readily forced into one of the notches 5. Then, by rotating the staff or pole about its axis, the fruit and its stem will be severed or detached, and the fruit will drop through the sleeve 3 into the conveyer or chute 7, from whence it will be conveyed to the lower end of the staff or pole. The fruit may be caught from the chute 7, by hand or may be received by a basket or other receptacle, according to the whim of the operator.

The present device is devoid of any complex or movable parts, and may be easily and conveniently manipulated to pick or gather the fruit in facile and expeditious manner, the sharpened edges of the tongues 6 facilitating the detachment of the fruit, as will be apparent. The ends of the tongues 6 being blunt, will prevent the said tongues from bruising or injuring the fruit, when the mouth of the sleeve is inserted over the fruit, and it will be evident that when the fruit is severed and passes down the sleeve into the conveyer, there will be no liability for the fruit to become bruised or injured. The sleeve 3 being co-axial with the staff or pole, is of advantage inasmuch as the sleeve may be conveniently manipulated to carry out the results desired, and the upper end or mouth of the sleeve being gradually contracted, will also assist in engaging the tongues 6, which converge toward the axis of the sleeve, to be engaged over the backs of the fruit to detach the same.

Particular attention is directed to the fact that the outer end portion of the sleeve or shell 3 is spun inwardly gently, to provide the contracted opening, and that the longitudinal open slots 5 are coextensive with the spun portion. Thus, the outer end portion of the sleeve or shell may be spun inwardly upon a lathe or any other suitable machine, prior to the formation of the slots 5 in the sleeve or shell, and when the slots are formed in the sleeve, it will be observed that the tongues formed thereby, will be reinforced or braced by the longitudinal and transverse curvature thereof.

Having thus described the invention, what is claimed is:

A fruit picker having a cylindrical member provided at its upper end with parallel sided stem receiving longitudinal slots defining spaced fingers curved inwardly toward their upper extremities and terminating in blunt ends in a common transverse plane, a staff disposed in line with the axial center of said cylindrical member and terminating at its upper end below the lower end of the cylindrical member, a fork connecting the upper end of the staff with the wall of the cylindrical member and having side elements unobstructing the lower outlet end of said cylindrical member, and a chute connected with the lower end of said member and extending between the elements of the fork to convey detached fruit without contact with said staff.

In testimony that I claim the foregoing as my own, I have hereto affixed my signature in the presence of two witnesses.

GEORGE J. FALLKIN.

Witnesses:
C. HOPEWELL,
FRED W. JACOBS.